United States Patent [19]

Smith

[11] Patent Number: 5,002,430

[45] Date of Patent: Mar. 26, 1991

[54] OIL CONTAINMENT SYSTEM FOR EMERGENCY USE

[76] Inventor: Richard D. Smith, 5 Commonwealth Rd., Natick, Mass. 01760

[21] Appl. No.: 546,392

[22] Filed: Jun. 29, 1990

Related U.S. Application Data

[63] Continuation-in-part of Ser. No. 458,898, Dec. 29, 1989.

[51] Int. Cl.$^5$ .............................................. E02B 15/06
[52] U.S. Cl. .................................. 405/66; 210/242.3; 210/776; 210/923
[58] Field of Search ................... 405/63, 66, 67, 68; 210/242.3, 776, 923

[56] References Cited

U.S. PATENT DOCUMENTS

| | | | |
|---|---|---|---|
| 3,631,679 | 1/1972 | Fisch | 405/68 |
| 3,665,713 | 5/1972 | Rath | 405/66 |
| 4,006,082 | 2/1977 | Irons | 210/242.3 X |
| 4,124,981 | 11/1978 | Preus | 405/66 |
| 4,249,834 | 2/1981 | Bouvier | 405/63 |

Primary Examiner—Randolph A. Reese
Assistant Examiner—Arlen L. Olsen
Attorney, Agent, or Firm—Weingarten, Schurgin, Gagnebin & Hayes

[57] ABSTRACT

A system and method for containing oil or other contaminants which have leaked from an oil tanker or similar structure is disclosed. A series of flotation members are connected end to end and stored around the perimeter of the tanker. A membrane is folded and packed into a recess in each member and held between the member and the tanker. The members are held against the sides of the tanker by a movable stay. In case of an oil leak, a triggering mechanism sequentially moves the stays to release the flotation members, which drop off the tanker into the water. One edge of the membrane is attached to the members while the opposite edge of the membrane is free. The free edge of the membrane falls from the members so that the membrane forms a curtain in the water. Each flotation member is further connected to adjacent members by a flexible jacket and adjacent edges of each membrane are connected to each other. In this manner, a continuous curtain surrounds the tanker to prevent passage of all or most of the spilled oil. The curtain and/or the tanker may be maneuvered to best contain the spill. The curtain may be detached from the tanker and maneuvered to pinch off and isolate the spill from the tanker.

14 Claims, 15 Drawing Sheets

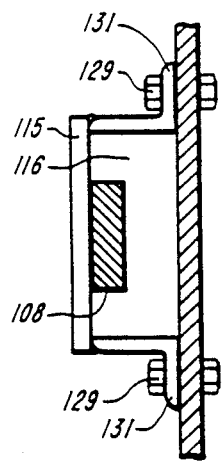
FIG. 13
FIG. 20
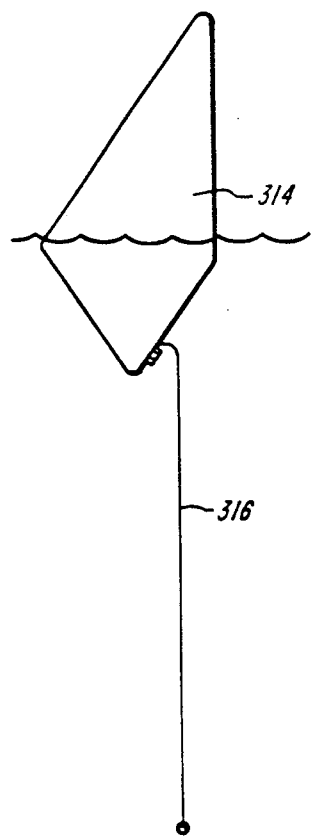
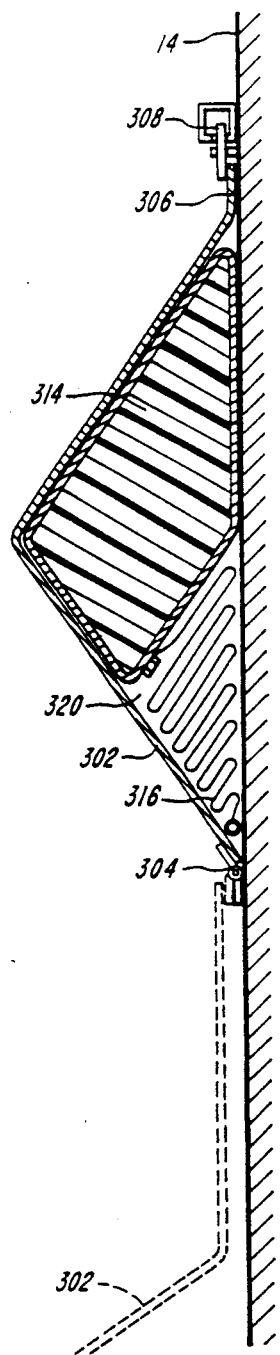
FIG. 19

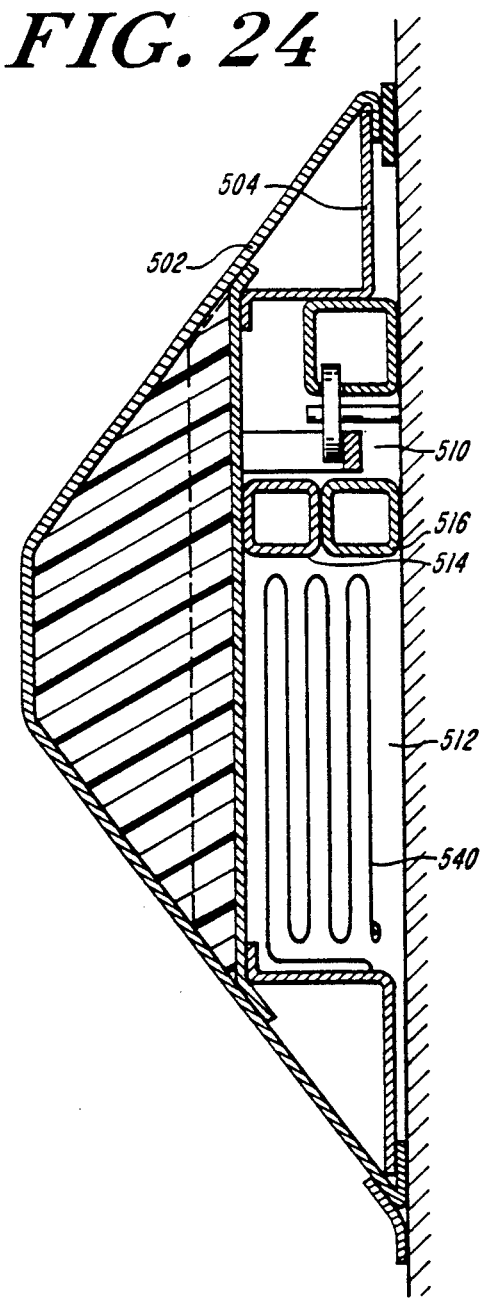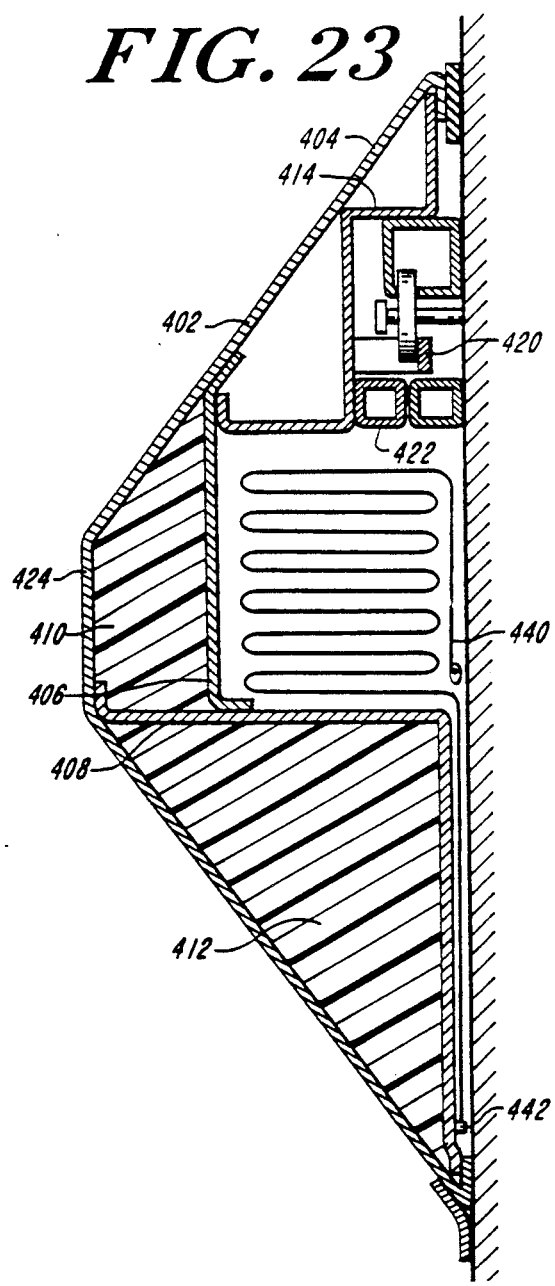

OIL CONTAINMENT SYSTEM FOR EMERGENCY USE

This application is a continuation-in-part of U.S. Pat. application Ser. No. 07/458,898, filed on Dec. 29, 1989.

FIELD OF THE INVENTION

This invention relates to the field of hazardous materials and more particularly to systems for containing spilled contaminants.

BACKGROUND OF THE INVENTION

Leakage of contaminants, particularly oil, from oil tankers, offshore drilling platforms, or similar structures poses a serious environmental hazard. Various methods of cleaning up such spills have been devised. However, the longer the clean-up procedures take, the farther the spill travels from the ship. Consequently, the spill becomes even more difficult to clean up.

Devices are known to confine the spill to a manageable area. For example, oil fences comprising floats with curtains suspended from the floats have been used. Such a fence generally must be towed by tugboats until the fence surrounds the spill. A disadvantage to this approach is that time is lost getting the tugboats and the fence to the location of the spill.

Another solution has been to carry the fence on the oil tanker itself. However, previous devices of this nature take up room and are difficult to deploy.

SUMMARY OF THE INVENTION

The present invention provides an oil containment system for mounting on oil tankers or the like which takes up little room when stored on the tanker and is easily and rapidly deployable and maneuverable to contain a spill as soon as it occurs. In addition, the present oil containment system is readily mountable on the tanker and may be remounted for reuse.

A series of connectable flotation members are stored around the perimeter of the tanker. A membrane is folded and packed into a recess in each member and held between the member and the tanker. One edge of the membrane is attached to each flotation member while the opposite edge of the membrane is free. The members are held against the sides of the tanker by a releasable stay. In case of an oil leak, a triggering mechanism sequentially releases the stays to allow the members to drop off the tanker into the water. The free edge of the membrane falls from the canister so that the membrane forms a curtain in the water. Each flotation member is further connected to adjacent members by a flexible jacket and adjacent edges of each membrane are connected to each other. In this manner, a continuous curtain surrounds the tanker to prevent passage of most of the spilled oil. The curtain and/or the tanker may be maneuvered to best contain the spill. The curtain may be detached from the tanker and maneuvered to pinch off and isolate the spill from the tanker.

DESCRIPTION OF THE DRAWINGS

The invention will be more fully understood from the following detailed description taken in conjunction with the accompanying drawings in which:

FIG. 13 is a plan view along line XIII—XIII of FIG. 11;

FIG. 19 is a further embodiment of the present invention in the storage position;

FIG. 20 is the embodiment of FIG. 19 in the deployed position;

FIG. 23 is a further embodiment of the present invention;

FIG. 24 is a further embodiment of the present invention;

DETAILED DESCRIPTION OF THE INVENTION

Figure 1:
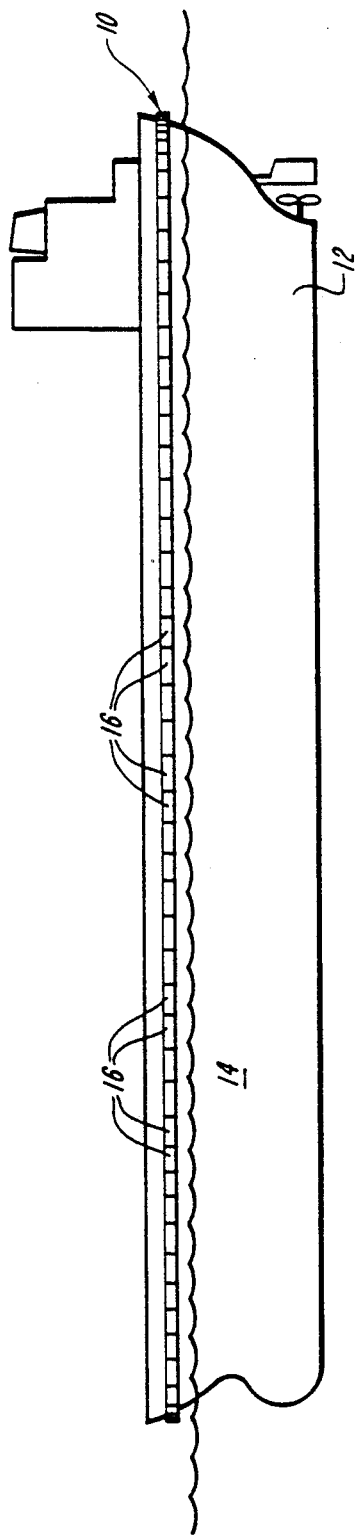
FIG. 1 is a side elevational view of an oil tanker illustrating the oil containment system of the present invention in its storage position on a tanker.
Figure 2:
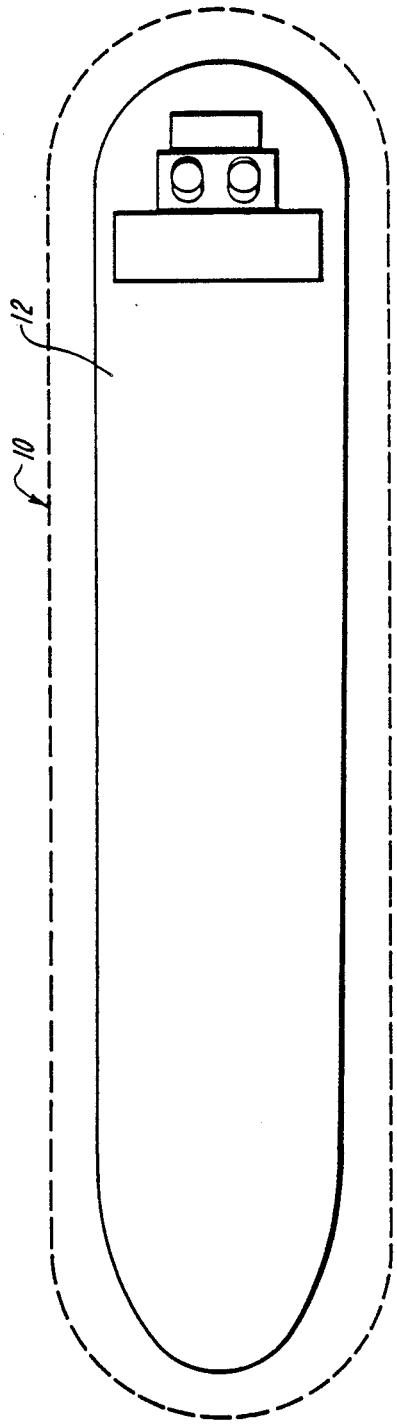
FIG. 2 is a top plan view of the tanker of FIG. 1 illustrating the oil containment system of the present invention in its deployed position in the water.

The invention is shown generally at 10 in FIGS. 1 and 2. The invention comprises floatable members 16 attached serially to surround an oil tanker 12. In the stored position, the floatable members are mounted to the sides 14 of the tanker as shown in FIG. 1. The invention is shown in its deployed position by the dotted line in FIG. 2. When deployed, flexible jackets interconnecting the floatable members expand the distance between each member so that the members are spaced away from the sides of the tanker. A membrane is attached to the floatable members and drops from the floatable members to form a continuous curtain in the water. In this manner, the invention forms a continuous boundary surrounding the tanker to contain the oil in the vicinity of the tanker.

Figure 6:
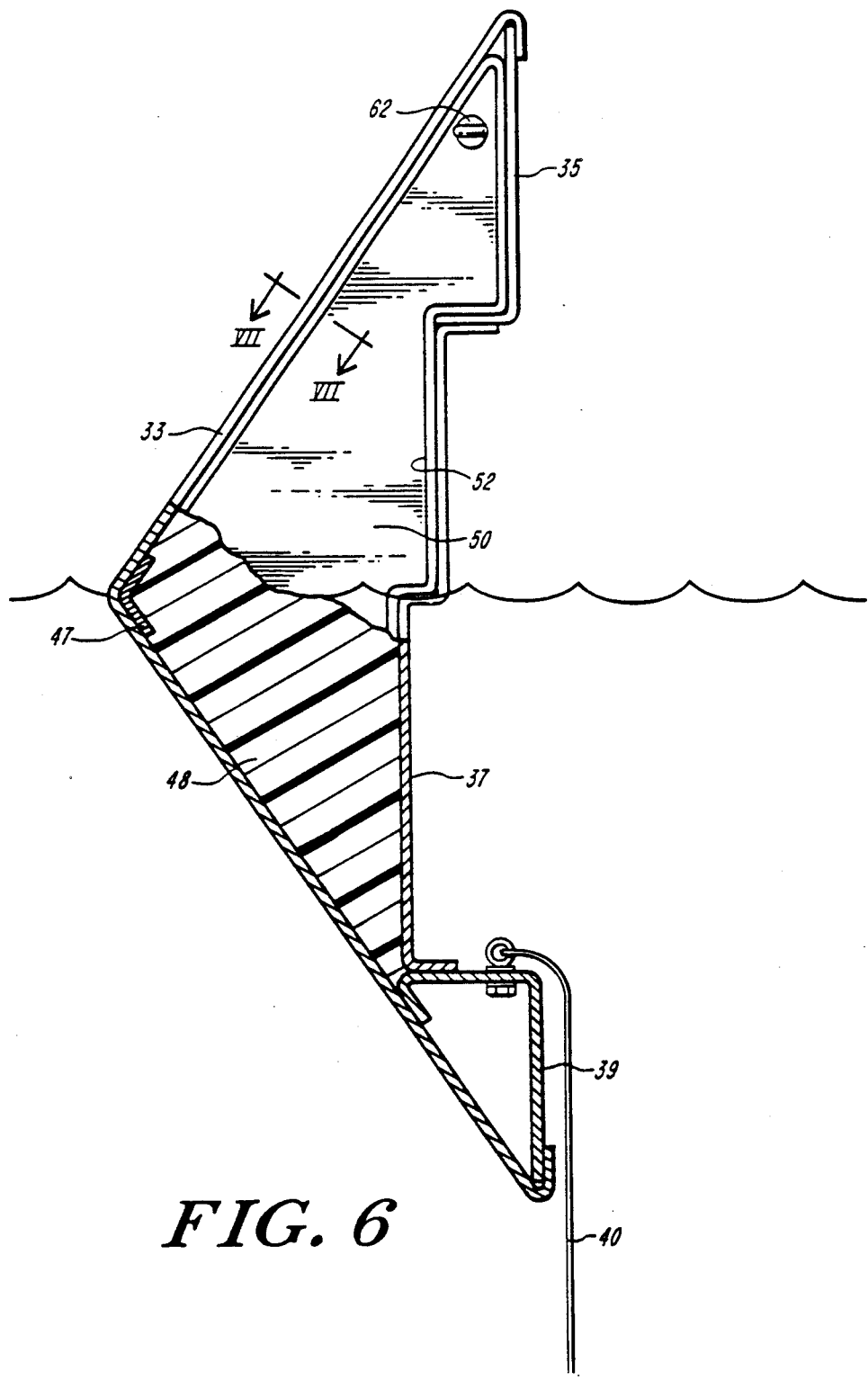
FIG. 6 is a side elevational view of the system of FIG. 5 with a portion cut away.
Figure 7:
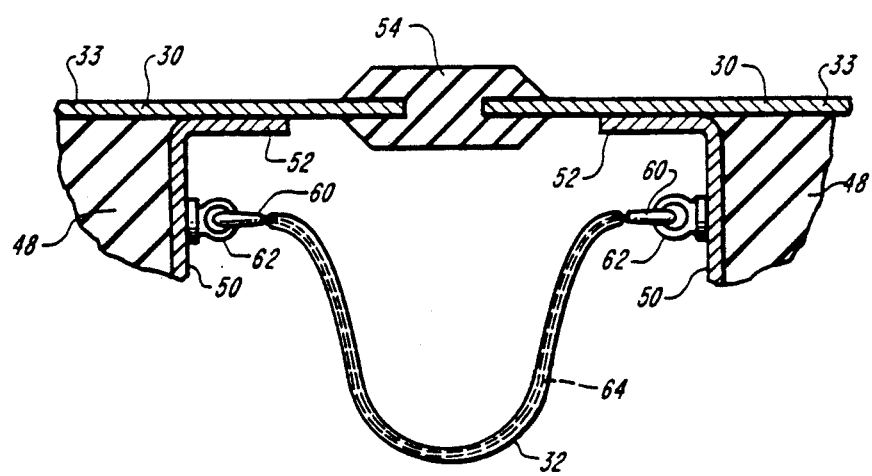
FIG. 7 is a cross-sectional view along line VII—VII of FIG. 6.
Figure 8:
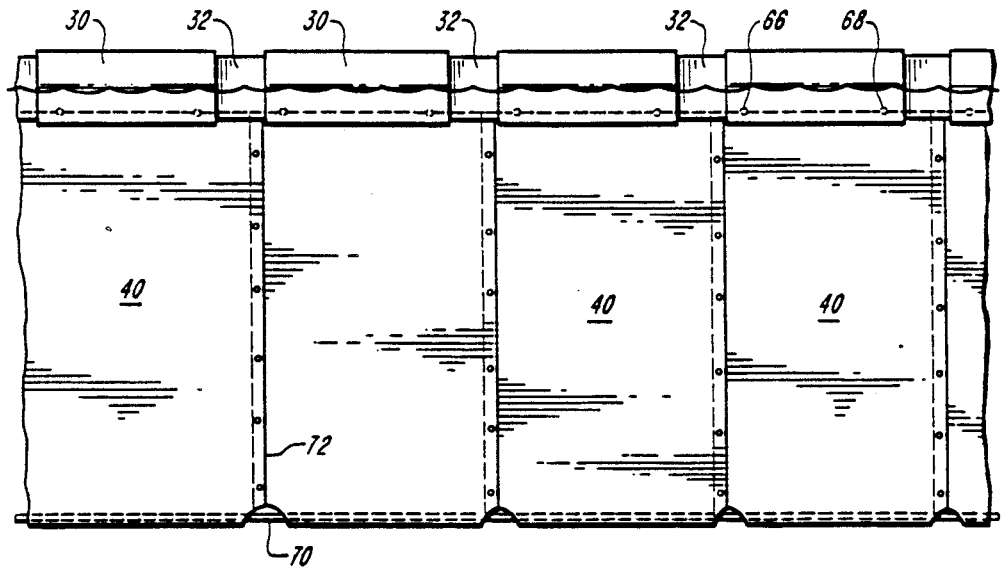
FIG. 8 is a side elevational view of the system of FIG. 3 in the deployed position.

The preferred embodiment of the present invention is shown more particularly in FIGS. 3–16. The floatable members comprise canisters 30 arranged serially end to end, as shown in FIGS. 8 and 10. The canisters preferably are made of stainless steel for good water and corrosion resistance, although any other suitable material, such as polyvinyl chloride, or composites of materials, including a durable coating of materials such as stainless steel or polyvinyl chloride, may be used.

Figure 4:
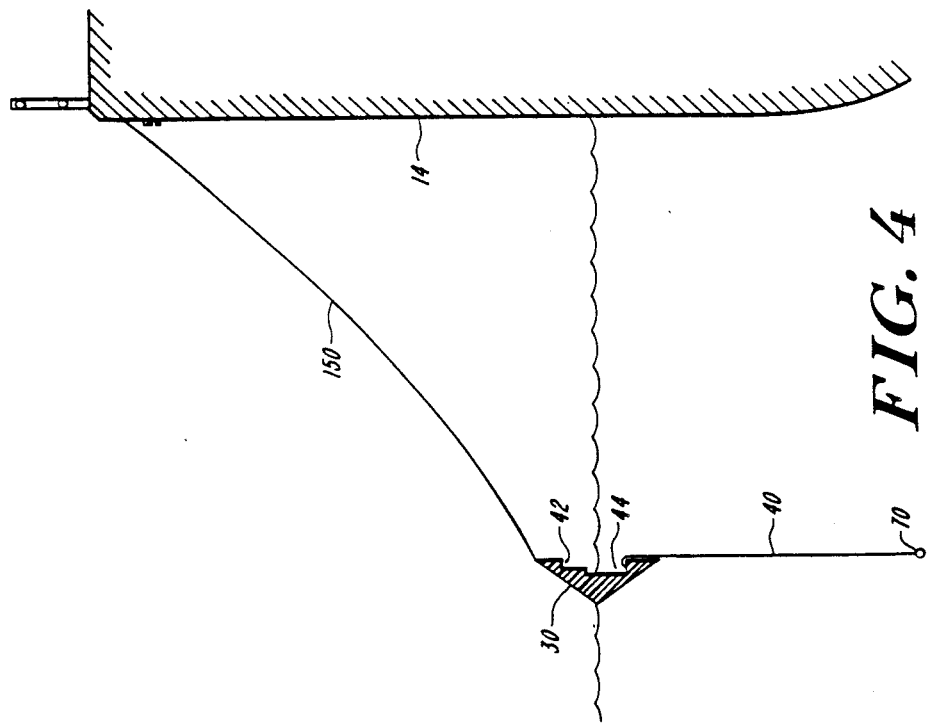
FIG. 4. is a further partial cross-sectional view of the system illustrated in FIG. 3 in the deployed position.
Figure 3:
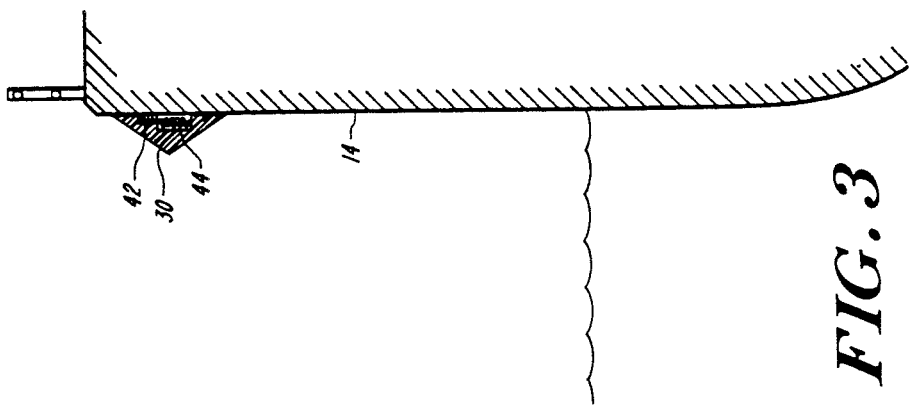
FIG. 3 is a partial cross-sectional view of the oil containment system of the present invention in its storage position.

Each canister has a generally triangular cross-sectional shape with two recessed areas 42, 44 in one face, as shown in FIGS. 3 and 4. The upper recessed area 42 contains a securing mechanism for securing the canisters to the tanker and a triggering mechanism for releasing the canisters from the tanker, to be more fully described below. The lower recessed area 44 forms a membrane storage recess, also to be more fully described below.

Figure 22:
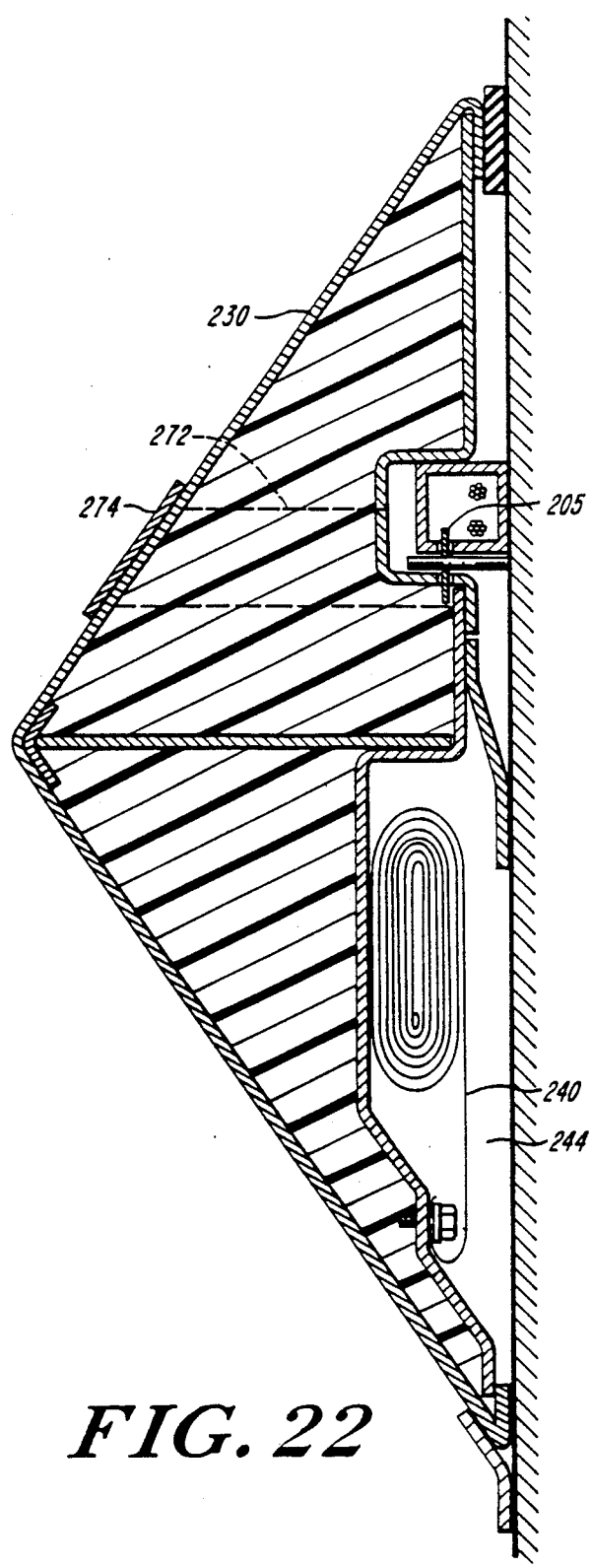
FIG. 22 is a cross-sectional view of a further embodiment of the present invention.

The canister may be readily formed from plates or sheets of stainless steel bent to a suitable shape and joined by welding or any other suitable manner known in the art to form a water-tight seal. In the embodiment shown in FIG. 5, four plates 33, 35, 37, 39 are used. Internal bracing members 43, 45, 47 may be provided to strengthen the canisters. Additionally, the plates may include extended elements to provide further strengthening, such as element 41 of plate 35, and element 46 of plate 39. Other canister configurations, such as, for example, the configurations shown in FIGS. 22-24, are contemplated by the invention End caps 50, formed to fit the cross-sectional shape of the canister, may be welded or otherwise joined to close off the ends of each canister, as shown in FIGS. 6 and 7. Cap 50 preferably includes a lip 52 extending around its perimeter to fit against the plates 33, 35, 37, 39. A suitable flotation material 48 such as a closed cell foam, to aid in strengthening the canister and in preventing damage from leakage, is preferably inserted into the cavity or cavities of each canister formed by the plates and end caps.

Plate 33 preferably extends beyond each end cap 50, as shown in FIG. 7. Gasket 54 provides a seal between adjacent canisters when the canisters are in the storage position. This gasket preferably is securely fastened to one of the canisters and pulls off the adjacent canister during deployment.

Figure 9:
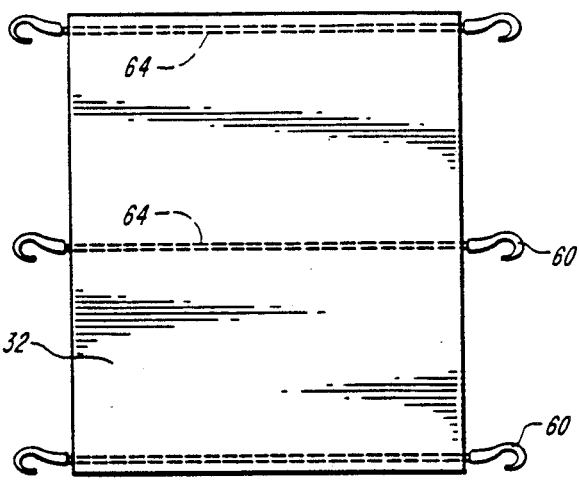
FIG. 9 is a side elevational view of a jacket employed in the system of FIG. 7.
Figure 10:
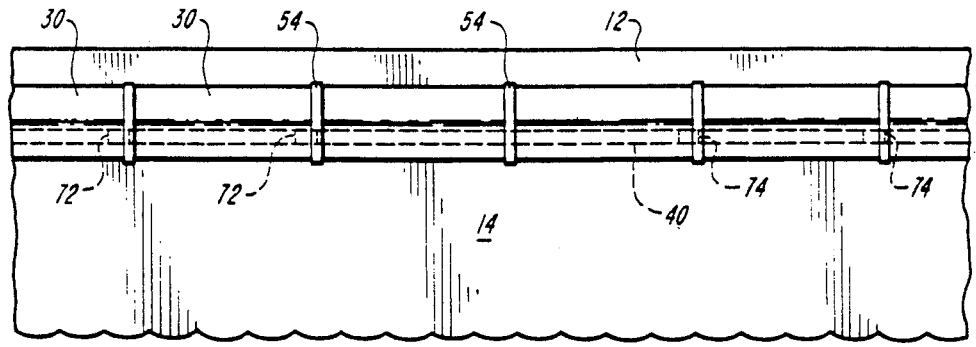
FIG. 10 illustrates a section of the present invention in the storage position.

Flexible jacket 32 spans the gap between adjacent canisters 30, as shown in FIGS. 7 through 9. The jackets form a continuous barrier between canisters when they are deployed. Hooks 60, crimped closed, fasten the jacket to eyes 62 on end caps 50, although the jacket may be fastened in any other suitable manner. Cables 64 are provided within the jacket and extend between the hooks. When the system is stored, the jackets are slack. When deployed, the slack in the jackets is taken up, allowing the distance between adjacent canisters to increase so that the system may be spaced away from the tanker to encompass a larger volume of contaminant. Cables 64 bear the load exerted by the canisters when deployed. Each canister may additionally be connected to adjacent canisters by a short cable link (not shown) as a safety measure.

A membrane 40 is attached to each canister 30 along its upper edge. A cable or chain 70 is generally encased along the bottom edge of the membrane. Preferably, a single sheet of membrane is attached to each canister and extends slightly beyond one end of the canister, as shown in FIGS. 8 and 10. Adjacent membrane sheets are fastened along their vertical edges 72 in any suitable manner. Preferably, the membrane sheets are fastened with removable or releasable fasteners. Alternatively, one sheet of membrane may span several canisters before joining an adjacent sheet of membrane. Each membrane sheet may have a cut away area 76 to accommodate connections between adjacent cables or chains 70. Each membrane sheet is also fastened to each canister in any suitable manner, such as by fasteners at points 66, 68 as shown in FIG. 8. The membrane may be formed from any suitable geotextile known in the art. In an alternative embodiment, each membrane sheet may be integral with the jacket interconnecting two canisters.

Figure 5:
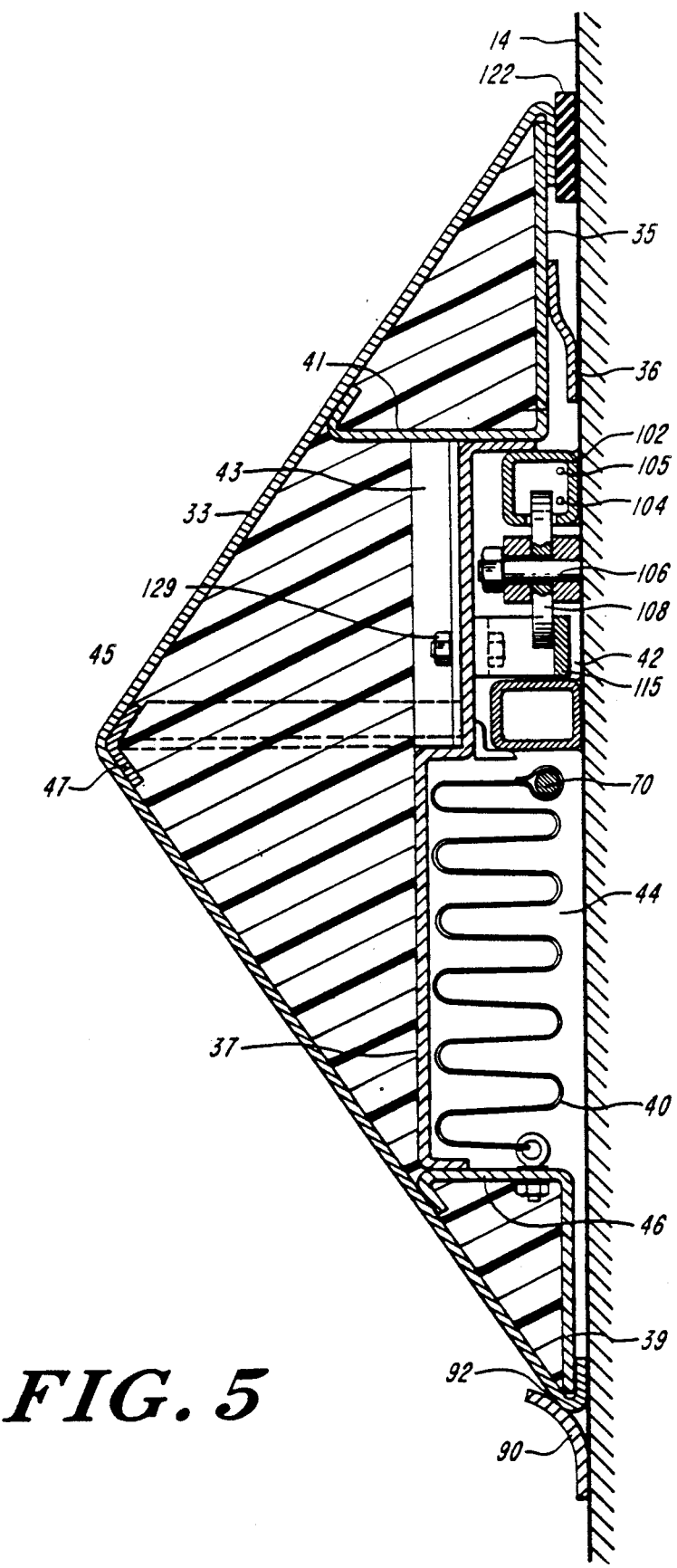
FIG. 5 is a partial cross-sectional view of the oil containment system illustrated in FIG. 3.

As shown in FIGS. 5 and 10, the membrane 40 is folded up with horizontal folds for storage within the recessed area 44 and held between canisters 30 and the side 14 of the tanker when the canisters are in the storage position. Since each sheet of membrane is longer than its associated canister to allow expansion of the membrane to its full length when deployed, the extension of the membrane sheet beyond the canister end is folded with two vertical folds, shown by dotted lines 72, 74 in FIG. 10, to fit compactly within the recessed area 44. If desired, a small section of the bottom edge of each membrane sheet may be left free of the cable or chain 70 to better accommodate this folding. In this manner, the stored membrane is readily deployable and protected from buffeting by waves.

Figure 18:
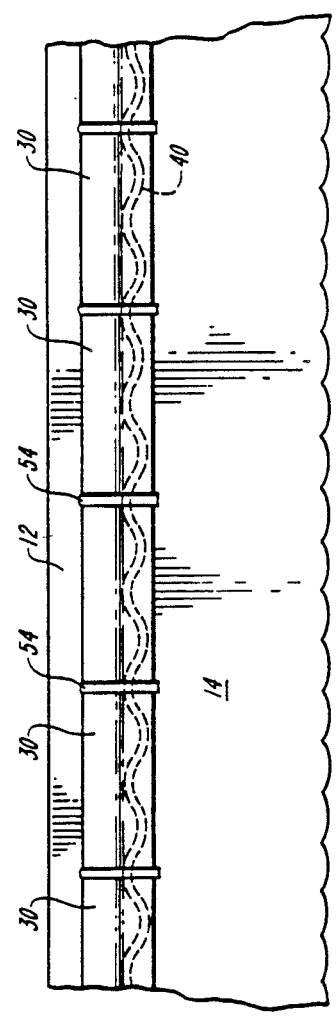
FIG. 18 is a partial elevational view of a further embodiment of the present invention.

In an alternative embodiment, the membrane 240 may be horizontally folded or rolled and inserted into the recessed area 244 with a sinuous or wavy shape, as shown in FIGS. 18 and 22. The recessed area is suitably sized to accommodate this sinuous shape.

When the system is deployed in the water, as shown in FIGS. 4 and 8, the membrane unfolds (or unrolls) and the vertical folds (or sinuous shape) flatten out so that the membrane can surround the tanker at a distance spaced away from the tanker. The canisters 30 float on the surface and the membrane 40 is suspended from the canisters. Weights (not shown) may be provided on the bottom edge of the membrane if desired, but the weight of the membrane 40 and the encased cable or chain 70 is generally sufficient, so that such weights are not necessary.

The canisters 30 preferably are mounted slightly below the level of the deck of the tanker to be as far removed from the buffeting of waves as practicable. As shown in FIG. 5, angled seating members 90 may be welded at intermittent locations along both sides 14 of the tanker's hull. The bottom 92 of each canister 30 rests in these seating members. These seating members preferably are spaced so that one seating member supports the ends of adjacent canisters.

Figure 11:
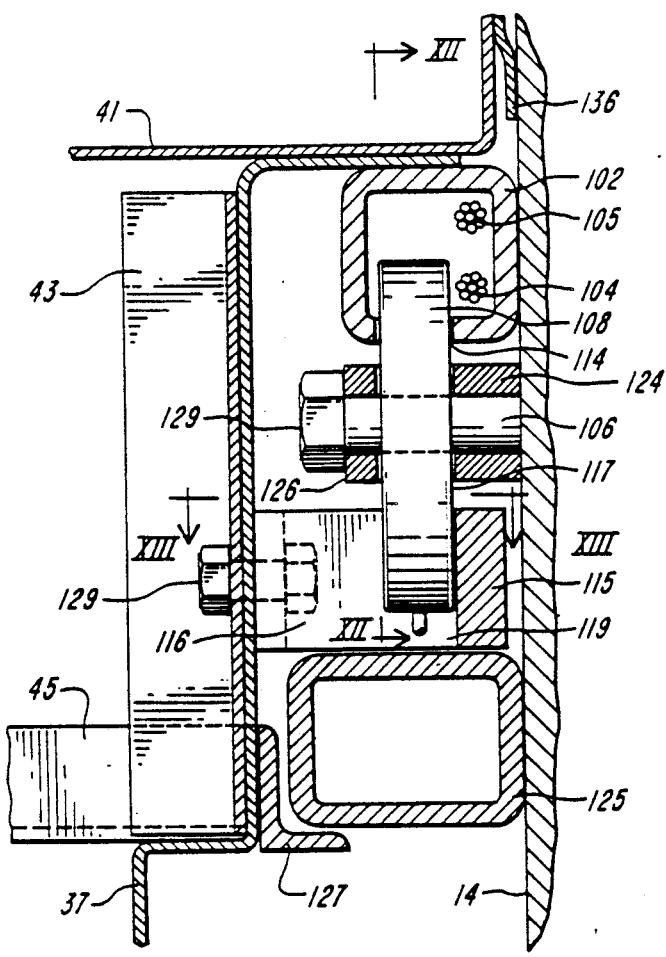
FIG. 11 is a cross-sectional view of a securing and triggering mechanism employed in the system of FIG. 5.

The canisters are secured to the hull by a mechanism mounted within the recessed area 42. As shown in FIGS. 5 and 11, a conduit 102 is fastened to both sides 14 of the hull somewhat above the seating members 90 and positioned to fit within recessed area 42 of the canister. These conduits run the entire length of the tanker on both sides. A pin 106 is fastened to the side 14 directly below conduit 102 at intervals of generally twice per canister. Cam 108 is pivotally mounted on this pin.

Enlarged head 120 of pin 106 and bushings 124, 126 are provided to prevent the cam 108 from slipping on the pin. As shown in FIG. 13, cam stays 115 are generally U-shaped brackets having two flanges 131 fastened to the canisters by bolts 129. Each cam fits through an opening 114 in conduit 102 and an opening 116 in cam stay 115. Openings 114 and 116 are vertically aligned with one another. When the cams are inserted through these openings, the canisters 30 are held against the tanker hull in the storage position. Face 117 of cam 108 may be beveled slightly to more tightly engage with face 119 of cam stay 115 as the cam is rotated into opening 116. Additional bearing members 125, 127 may be provided to further support the canisters and prevent distortion by wave buffeting.

Figure 12:
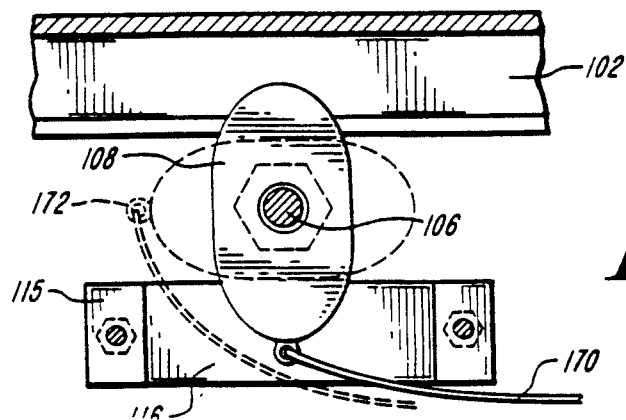
FIG. 12 is a cross-sectional view along line XII—XII of FIG. 11.

The canisters are mounted on the tanker hull by first placing the bottoms 92 into seating members 90. As shown in FIG. 12, a wire 170 is attached to each cam 108 by eye 172. Wire 170 extends through opening 116 in cam stay 115 out to the side of the canister. By pulling on wire 170, the cam is rotated into position to lock the canister against the hull, as shown by the dotted lines in FIG. 12. A gasket 122 may be provided along the sides of the hull at the top of the canister to minimize water running between the canister and hull and provide tension on the assembly to maintain it snugly against the ship.

An alternative embodiment for initially mounting the canister to the vessel is shown in FIG. 22. In this embodiment, cams 250 are rotated into position by a tool that reaches through an access port 272 provided in each canister 230. The access port may be protected by a cover 274.

Figure 14:
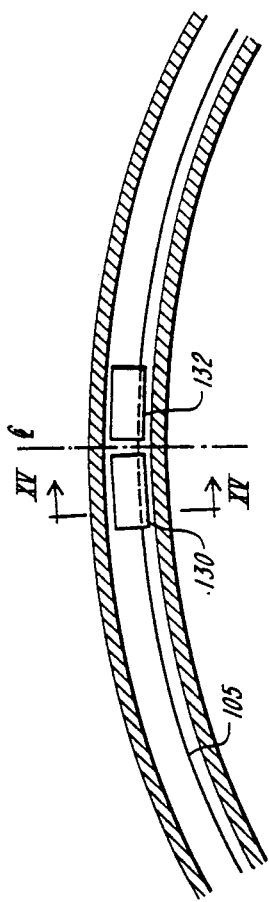
FIG. 14 is a plan view of the system of FIG. 3 at the bow of a vessel.
Figure 15:
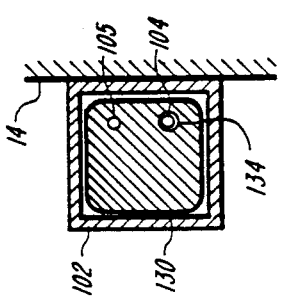
FIG. 15 is a partial cross-sectional view along line XV—XV of FIG. 14.

The preferred embodiment of a triggering mechanism employed to deploy the system is shown in FIGS. 11 and 14-16. As shown in FIG. 14, conduit 102 extends around the bow of the tanker. Two pistons 130, 132 are carried in closely spaced alignment inside the conduit 102, one on each side of the ship. Cables 104, 105 are provided vertically adjacent to each other inside conduit 102 to surround the hull. Cable 104 is fastened to piston 132 and extends through a hole 134 in piston 130, as shown in FIG. 15. Similarly, cable 105 is fastened to piston 130 and extends through a hole in piston 132.

Figure 16:
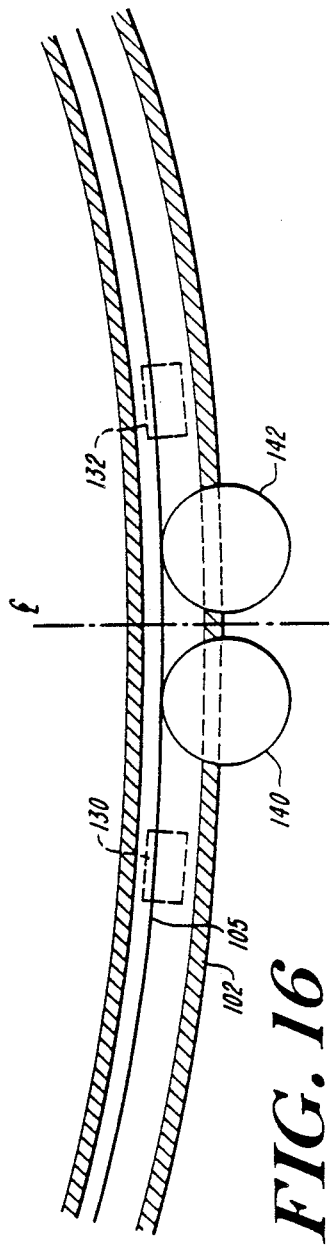
FIG. 16 is a plan view of the system of FIG. 3 at the stern of a vessel.

Conduit 102 extends around the bow of the tanker, as shown in FIG. 16. Motors 140, 142 are provided for pulling cables 104 and 105 respectively around the ship in a circuit. As each cable 104, 105 is pulled around, the piston to which the cable is connected is pulled through conduit 102. The piston hits each cam 108 sequentially and rotates the cam so that the cam is no longer inserted in opening 116 of cam stay 115, as shown by the solid line in FIG. 12. When the cams are in this position, the canisters 30 are no longer secured to the hull of the tanker and tend to fall away from the hull, dropping out of their seatings 90 and into the water. Leaf springs 136 provide an additional force tending to rotate the canisters 30 away from the hull. In this manner, the canisters are deployed sequentially, beginning at the bow of the tanker and ending at the stern. Specially formed flexible jackets and floats preferably are provided to cover the bow and stern assemblies and connections are provided to the port and starboard assemblies.

Figure 17:
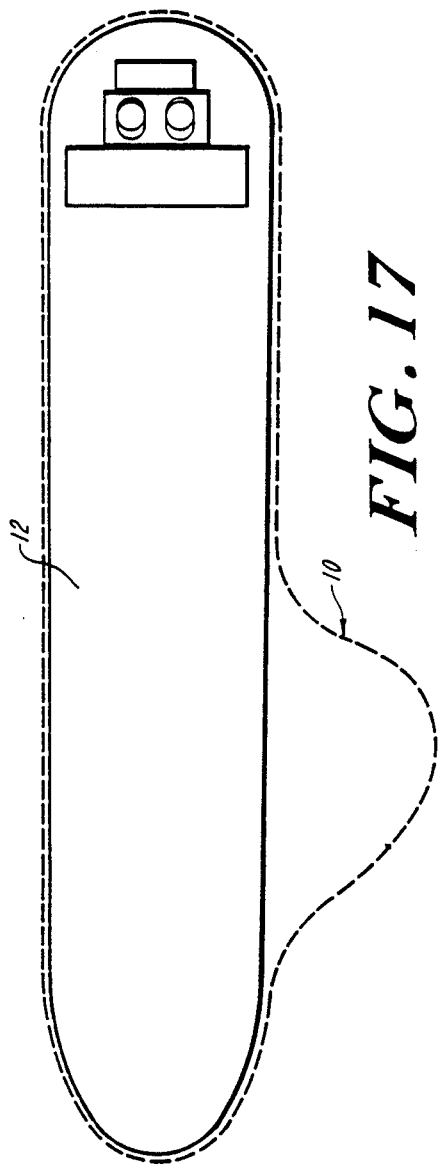
FIG. 17 is a plan view of the system in the deployed position.

When the system is deployed in the water, additional cables 150 preferably are provided to loosely tether occasional canisters to the tanker, as shown in FIG. 4. These cables allow the deployed barrier to be maneuvered around the tanker for optimal performance. For example, as shown in FIG. 17, if the spill is discharging a greater amount of oil on one side of the tanker, the tethering cables on the opposite side can be pulled in to allow the barrier to expand on the side of the spill. Also, the tanker itself may be maneuvered so that the barrier expands on the side of the greatest amount of the spill or to place the spill on the leeward side of the tanker. Protective guards (not shown) may be installed to prevent propeller fouling.

Figure 21:
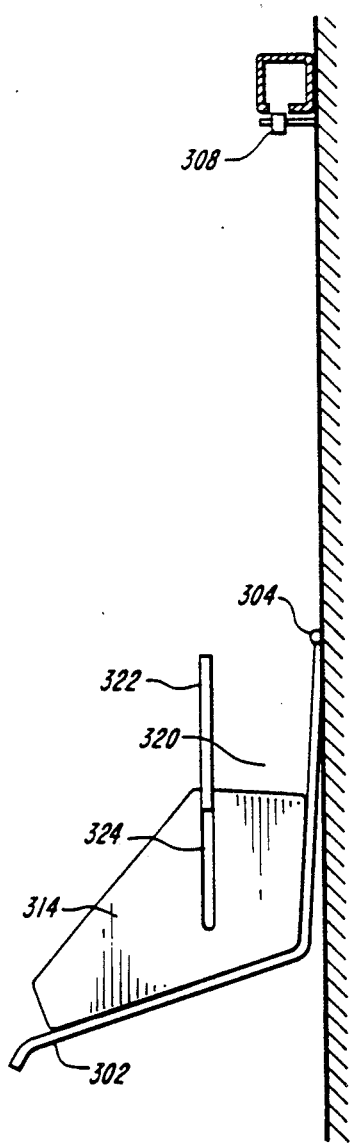
FIG. 21 is the embodiment of FIG. 19 during mounting into the storage position.

A further embodiment is shown in FIGS. 19-21. A triangular cover 302 is pivotably mounted to the side 14 of the vessel 12 at hinge 304. A plurality of such covers 302 extend the length of both sides of the vessel. At the upper end of cover 302 is lip 306. Cover 302 is held in the storage position by pivotable cam 308. Cam 308 is preferably similar to cam 108 and the triggering mechanism for releasing covers 302 is preferably similar to that described above. Covers 302 may be overlapped at their edges such that, when sequentially deployed, the first cover to be released laps over the next cover to be released.

Within cover 302 is contained float canister 314 and membrane 316 attached to canister 314. Membrane 316 is packed within storage area 320 in a manner similar to that previously described. As shown in FIG. 21, bars 322 removably inserted in tubular sockets or seatings 324 mounted on each end of each canister 314 aid in retaining the folded membrane in area 320 during mounting. Bars 322 may be removed as covers 302 are closed against the hull. When the system is deployed, cover 302 drops down, as shown by the dotted lines in FIG. 19, and canister 314 and membrane 316 drop into the water, as shown in FIG. 20. Float canisters 314 are preferably connected to one another with jackets such as jacket 32 described above.

A further embodiment is shown in FIG. 23. In this embodiment, canister 402 comprises sheets 404, 406, 408, which form two cavities 410, 412, which may be filled with a flotation material. Sheet 404 may also have a flat portion 424 to strengthen the canister. Bracing member 414 is provided on the upper portion of the canister to further strengthen the canister and reduce the weight. Several such bracing members may be provided on each canister. Cam stay member 420 and support member 422 may be mounted to the bracing members 424. Additionally, membrane 440 may be attached to the canister at point 442 near the bottom of the canister. This canister configuration tends to provide a lower center of gravity and increased stability in the water.

A further embodiment is shown in FIG. 24. This embodiment is also provided with intermittent bracing members 504 in the upper portion of canister 502. The securing and triggering mechanisms, which may be as previously described, are contained in area 510 and the membrane 540 is contained in area 512. Areas 510 and 512 are separated by support member 514 attached to the canister and support member 516 attached to the hull.

Figure 25:
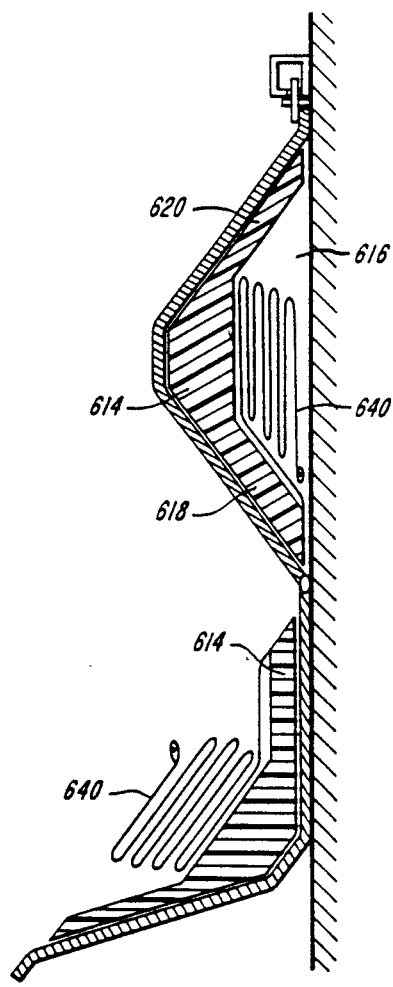
FIG. 25 is a further embodiment of the present invention.
Figure 26:
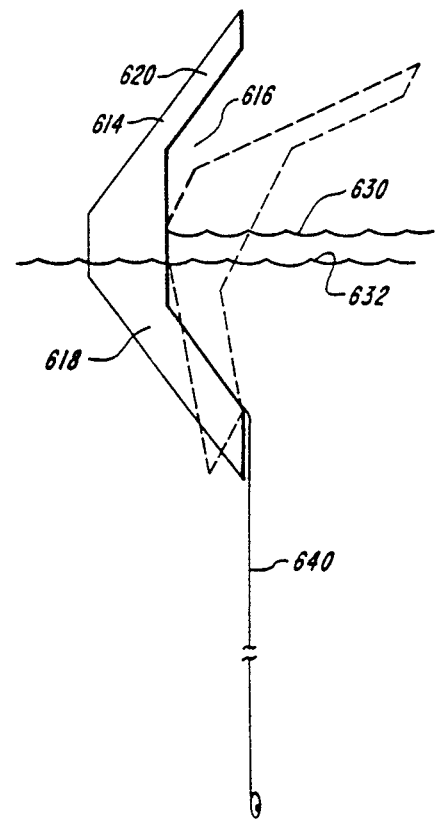
FIG. 26 is the embodiment of FIG. 25 in the deployed position.

An additional embodiment, similar to the embodiment of FIGS. 19-21, is shown in FIGS. 25 and 26. The flotation member 614 has a generally triangular configuration with a recessed area 616 in one face for storage of membrane 640. The lower portion 618 of flotation member 614 is formed to be heavier or of greater density than the upper portion 620. The center of gravity of the member 620 is such that when deployed in the water, the member will tend to float in a position slightly tilted from an upright position as shown by the dotted lines of FIG. 26. Any contaminant 630 floating on the water surface 632, as shown in FIG. 26, or floating near the water surface, will provide a force tending to push the flotation member into the upright position, as shown by the solid line in FIG. 26. The recessed area 616 of flotation member 614 also further functions as a barrier to contain any contaminant.

The canister embodiments of FIGS. 3–16 and 22–24 also include recessed areas for membrane storage and for housing the securing and triggering mechanisms, as described above. These recessed areas may also function as a barrier to contain any contaminants floating on or near the water surface, as described in connection with the embodiment of FIGS. 25 and 26. Additionally, the floatable canister may be configured with its center of gravity such that the canister tends to float in a position slightly tilted from an upright position and any contaminant floating on or near the water surface will tend to force the canister into a more upright position, as described in connection with embodiment of FIGS. 25 and 26.

Once the barrier is deployed surrounding the tanker, the movement of the spill is ascertained to determine the optimal method of containing the spill. For example, the barrier may be left in position completely surrounding the tanker and the barrier's position and orientation in the water may be controlled by tethers attached to the tanker, as shown in FIG. 17, or by movements of the tanker itself. In this manner, for example, the barrier may be guided to balloon out on the side of the spill to encompass a great volume of material without forcing the contaminant around the sides of the tanker. The tanker may be allowed to drift, may be anchored, or may be moved and steered, depending on conditions.

Additionally, the barrier may be detached from the tanker and guided to pinch off and isolate the spill or sections of the spill from the tanker, as shown in FIGS. 27(a)–(d). This action is desirable if the spill has stopped or if additional containment systems or devices of any nature are available for further containment or clean up of the spill. Such isolation of the spill is also desirable if the spill is flammable or otherwise poses a hazard to the tanker personnel.

Figure 27A:
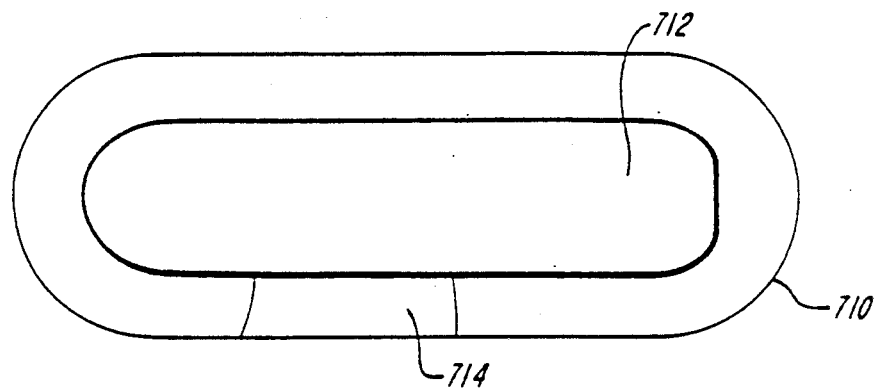
FIG. 27(a)-(d) illustrate a method of maneuvering the oil containment system of the present invention to isolate a spill.
Figure 27B:
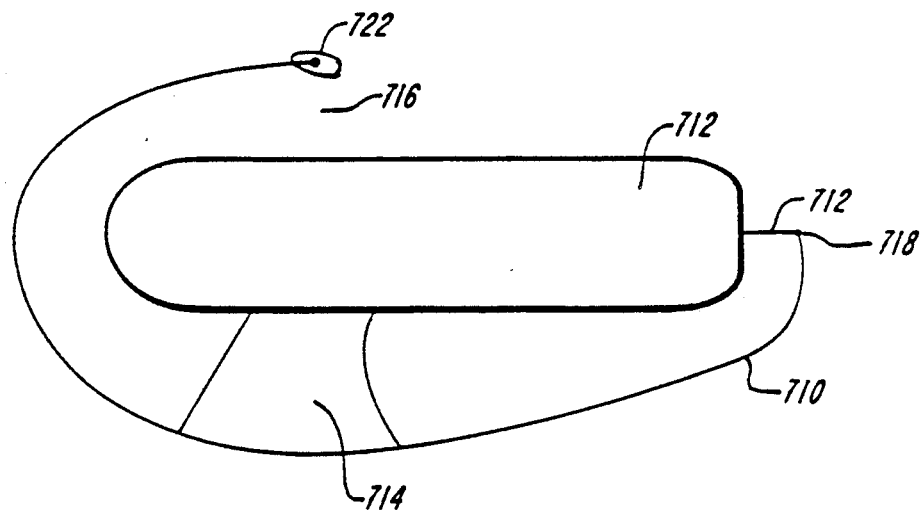
Figure 27C:
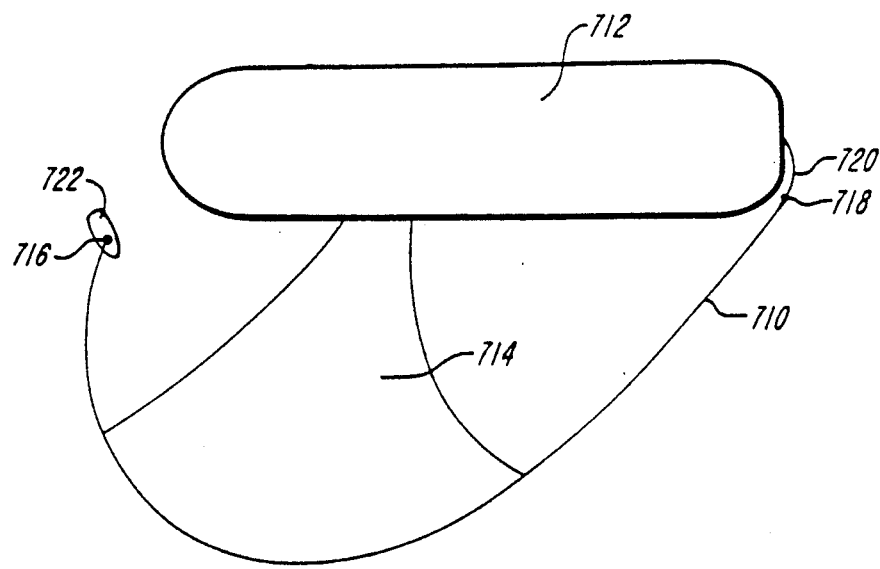
Figure 27D:
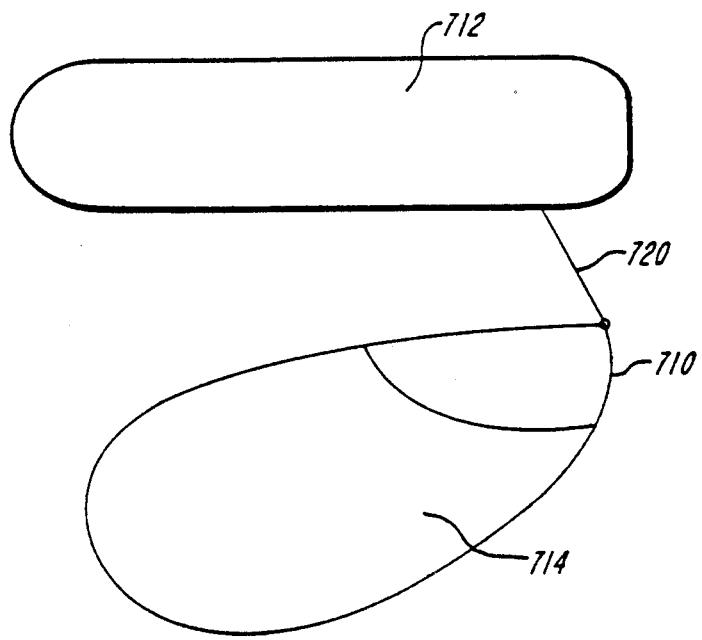

In FIG. 27(a), the barrier 710 completely surrounds the tanker 712 and the spill 714 is discharging from one side of the tanker. In FIG. 27(b), the barrier is broken open to form two ends 716, 718. One end 718 is attached to the tanker, either directly or with a tether 720. A small boat 722 captures the other end 716 so that it may be maneuvered around the tanker 712. The captured end is maneuvered around the tanker opposite the side from which the spill 714 is discharging. This maneuvering may be done by moving the small boat 722, by movements of the tanker 712, or a combination of both. Additionally, the small boat 722 may be remotely controlled if desired. As shown in FIG. 27(c), the boat 722 brings the captured end 716 of the barrier 710 around to the side on which the spill 714 is located, and the spill is maneuvered away from the tanker, either by naturally drifting away or by moving the tanker 712. The boat 722 with the captured end 716 of the barrier 710 pinches off the spill 714 to enclose it entirely within the barrier 710, as shown in FIG. 27(d). If the discharge of the spill from the tanker previously has been halted, the spill may be allowed to separate from the tanker before being encircled by the barrier as in FIG. 27(d). The encircled and isolated spill may then be marked with flags or other signaling devices for subsequent location and identification.

The invention has been described in relation to an oil tanker. However, the oil containment system of the present invention may be used with other structures, such as an offshore oil drilling platform, or any fuel powered vessel where the danger of contaminants leaking into water exists.

The invention is not to be limited by what has been particularly shown and described, except as indicated by the appended claims.

I claim:

1. A method for containing a contaminant spill leaking from a ship into water, comprising:
    providing a barrier in a storage position around the perimeter of the ship;
    deploying the barrier into the water to form a continuous loop surrounding the ship;
    breaking the continuous barrier at a point to form a first end and a second end; and
    maneuvering the first end of the barrier around the ship to rejoin the second end of the barrier with the contaminant contained within the barrier.

2. The method of claim 1 including attaching the second end of the barrier to the ship after breaking the barrier to form the first and second ends.

3. The method of claim 1 including attaching the barrier to the ship with a tether.

4. The method of claim 3 wherein the barrier is attached to the ship with the tether after the first and second ends are rejoined.

5. The method of claim 1 including marking the barrier with means for signalling after the first and second ends ar rejoined.

6. The method of claim 5 wherein the signalling means comprises a flag.

7. The method of claim 1 wherein a boat captures the first end of the barrier and maneuvers the first end around the ship.

8. The method of claim 7 wherein maneuvering the first end of the barrier around the ship includes moving the ship.

9. The method of claim 7 wherein the boat is remotely controlled.

10. A method for deploying an oil containment boom to surround a contaminant leaking from a structure into water, comprising:
    storing a continuous, impermeable barrier around the perimeter of the ship, the barrier comprising a plurality of flotation members connected end to end, a membrane attached along an edge to the flotation members to depend from the flotation members to form a continuous curtain surrounding the structure when the barrier is deployed in the water, and means for releasably storing the flotation members and the membrane around the perimeter of the structure; and
    deploying the barrier into the water to form a continuous loop in the water surrounding the structure by sequentially releasing each flotation member from the structure beginning at a first point and progressing sequentially along the barrier in opposite directions.

11. The method of claim 10 further including:
    breaking the continuous barrier at a point to form a first end and a second end; and maneuvering the first end of the barrier around the structure to rejoin the second end of the barrier with the contaminant contained within the barrier.

12. The method of claim 10 further including ballooning the barrier out on one side of the structure to contain a discharge of contaminant from the one side of the structure.

13. The method of claim 10 further including attaching tethers from the structure to the barrier and manipulating the tethers to maneuver the barrier.

14. The method of claim 10 wherein the structure is a ship.

* * * * *